United States Patent [19]

Kuriyama et al.

[11] Patent Number: 5,877,390
[45] Date of Patent: Mar. 2, 1999

[54] METHOD FOR DISPERSING CHEMICALS AND MICROORGANISMS INTO SOIL USING EXPLOSIVES

[75] Inventors: Akira Kuriyama, Atsugi; Yuji Kawabata, Kushihashi, both of Japan

[73] Assignee: Canon Kabushiki Kaisha, Tokyo, Japan

[21] Appl. No.: 767,852

[22] Filed: Dec. 17, 1996

[30] Foreign Application Priority Data

Dec. 19, 1995 [JP] Japan .................................. 7-330409
Dec. 19, 1995 [JP] Japan .................................. 7-330461

[51] Int. Cl.$^6$ ............................... A62D 3/00; B07B 3/00
[52] U.S. Cl. ........................ 588/205; 405/263; 222/637; 166/63; 435/262.5
[58] Field of Search ............................. 588/205; 405/128, 405/129, 263, 269; 166/308, 63, 297, 291; 222/249, 511, 637; 435/262.5

[56] References Cited

U.S. PATENT DOCUMENTS

| | | | |
|---|---|---|---|
| 3,308,818 | 3/1967 | Rutkowski | 128/173 |
| 3,978,921 | 9/1976 | Ross | 166/308 |
| 4,049,056 | 9/1977 | Godfrey | 166/250 |
| 4,342,310 | 8/1982 | Lindmayer et al. | 222/389 |
| 4,423,780 | 1/1984 | Vigneri et al. | 166/308 |
| 4,442,895 | 4/1984 | Lagus et al. | 166/250 |
| 4,662,451 | 5/1987 | Boade | 166/299 |
| 5,032,042 | 7/1991 | Schuring et al. | 405/258 |
| 5,101,900 | 4/1992 | Dees | 166/250 |
| 5,111,883 | 5/1992 | Savery | 166/269 |
| 5,133,625 | 7/1992 | Albergo et al. | 405/253 |
| 5,503,628 | 4/1996 | Fetters et al. | 604/72 |

FOREIGN PATENT DOCUMENTS

| | | | |
|---|---|---|---|
| 266728 | 10/1913 | Germany . | |
| 3545737 | 2/1987 | Germany | F42B 3/04 |
| 4001320 | 5/1991 | Germany | A62D 3/00 |

*Primary Examiner*—Gary P. Straub
*Attorney, Agent, or Firm*—Fitzpatrick, Cella Harper & Scinto

[57] ABSTRACT

A method and apparatus for diffusing a treating agent into a medium, a method and apparatus for injecting a liquid into a medium, and a method of remedying soil. The method of diffusing a treating agent into a medium, comprises a step in which a solidified treating agent is scattered and diffused by the pressure of a gas resulting from a gas-generating agent.

9 Claims, 3 Drawing Sheets

METHOD FOR DISPERSING CHEMICALS AND MICROORGANISMS INTO SOIL USING EXPLOSIVES

BACKGROUND OF THE INVENTION

1. Field of the Invention

The present invention relates to a method for diffusing a treating agent into a medium and an apparatus used therefor, a method for injecting a liquid into a medium and an apparatus used therefor, and a method of remedying soil.

2. Related Background Art

A large amount of chemical compounds or chemical products have been produced with the recent rapid progress in technology and science. Since most of these compounds or products did not originally exist in nature, they are barely decomposed naturally and thus, accumulate in the natural environment resulting in environmental pollution. In particular, land where many people live is readily affected by this artificial pollution. Since water circulates through land, the atmosphere and the hydrosphere, the environmental pollution of the land will spread globally. Well-known examples of pollutants in soil or land include organic compounds such as gasoline, organochloric chemicals such as PCB, teratogenic agrichemicals such as dioxin, as well as radioactive compounds. Fuel such as gasoline is commonly stocked in a huge amount in the underground tanks of gas stations etc. Thus, fuel leakage from deteriorated or broken tanks into soil is now a serious social problem. Further, organochloric chemicals, e.g. chlorinated aliphatic hydrocarbons such as trichloroethylene and tetrachloroethylene, were once extensively used for cleaning fine parts as well as for dry cleaning, and large scale pollution of soil and ground water due to the leakage of these chemicals has been gradually revealed. Since such organochloric chemicals are teratogenic and carcinogenic and adversely affect the biological world, remediation of the polluted soil or ground water is now an issue to be solved immediately, in addition to the isolation of the pollution source.

Methods for remedying soil polluted with these pollutants include, for example, heat treatment of the dug-up soil, vacuum extraction of the contaminant from the polluted soil, and microbial degradation of the pollutant in soil. Although the heat treatment can completely purify the soil, the soil must be dug up: thus, soil under structures cannot be purified. Moreover, it is unsuitable for large-scale treatment because of the immense costs of digging and heating. Although the vacuum extraction method is a simple and economical remediation method, organochloric compounds in a concentration of several ppm or lower cannot be efficiently removed and this remediation process requires time on the scale of years. On the other hand, microbial remediation does not require digging up of soil, so it can purify the soil under structures, and use of microorganisms of high degradation activity enables short-time remediation. Thus, this economical and effective remediation method has been attracting attention lately.

Conventional methods of remedying contaminated soil by using microorganisms can be classified into those utilizing indigenous microorganisms naturally inhabiting the soil, and those which utilize foreign microorganisms not naturally inhabiting the soil. In the former case, generally chemical substances such as nutrients, inducers and oxygen for increasing the degradation activity of the microorganisms are injected into the soil as well as microparticles such as bentonite which stimulate the growth of the microorganism (Japanese Patent Application No. 7-108678). In the latter case, the foreign microorganism is injected into the soil as well as the substances to enhance their biodegradability. For example, U.S. Pat. No. 5,133,625 describes a method in which the injection pressure, flow rate and temperature are measured by using an extendable injection pipe to control the injection pressure, thereby the concentration of microorganisms and that of nutrients in the soil, to carry out remediation of soils efficiently.

U.S. Pat. No. 5,133,625 discloses a method for efficiently remedying soil using an extensible injection pipe through which the injection pressure, flow rate, and temperature can be determined to control the injection pressure, thus to control the concentrations of microbes and nutrients in the soil. U.S. Pat. Nos. 4,442,895 and 5,032,042 disclose a method of effective in situ microbial remediation of polluted soil, where cracks are formed in the soil using a liquid or a gas injected into the soil with pressure from an injection well. U.S. Pat. No. 5,111,883 discloses a method for injecting chemicals vertically or horizontally into a limited region of the soil by setting the relative position of the injection and extraction wells.

Injection of a pollutant-decomposing microorganism, nutrients, an inducer, oxygen, and other chemicals into the soil is considered to be essential for the microbial remediation of polluted soil. However, according to the conventional injection methods, an extremely large amount should be injected to remedy a wide area, since the liquid agent is injected from the injection element to fill the soil pore space. Such a process increases the processing period, labor and material costs, resulting in increased remediation expenses. Differing from chemicals, microorganisms can spontaneously grow and multiply when certain growth conditions, such as availability of nutrients are satisfied. If a liquid agent containing the microorganism and nutrient can be injected in an amount as small as possible into a wide area of soil and the microorganism can grow in the soil to decompose pollutants, the remediation expense is considerably decreased. However, when the necessary amount of the microorganism and nutrient is injected into a wide area after dilution, the processing period and labor required for injection do not decrease. Further, a method where the liquid agent will fill most of the soil pore space may cause soil fluidization and may soften the ground. Thus, it cannot be applied to the soil under heavy structures. Moreover, the liquid agent injected into the soil penetrates into the deeper layers and diffuses into underground streams. Therefore, mobile microorganisms and nutrients will not remain within the desired area and are lost. Thus, reinjection is required, making it difficult to remedy soil at a low cost. Further, the runoff of the microorganism and nutrient may cause secondary environmental pollution. Consequently, in microbial soil remediation, an injection method is required providing a small amount of the agent into a wide area of soil without filling all the pore space of the soil.

For example, German Patent 4001320A1 describes a method for diffusing into soil a substance which can activate microorganisms, wherein a cartridge composed of an explosive directly coated with the activation substance is buried into the contaminated soil and ignited. The blast, however, is basically generated by the combustion reaction of the explosive which raises the ambient temperature to cause thermal expansion of the air around the explosive. Accordingly, the substance for activating the microorganisms might be modified or the microorganisms themselves might be debilitated or killed by the heat.

SUMMARY OF THE INVENTION

The present invention has been made in view of the above-mentioned problems, and its objective is to provide a method for diffusing a treating agent into the environment extensively and an apparatus used therefor, where the amount of the treating agent to be injected is controlled to be as small as possible.

An aspect of the present invention is a method of diffusing a treating agent into a medium, which comprises a step of scattering and diffusing a solidified treating agent into the medium by a pressure of a gas evolved from a gas-generating agent.

Another aspect of the present invention is a method of diffusing a treating agent into a medium, which comprises a step of preparing a diffusion element which comprises a gas-generating agent coated with a solidified treating agent, a step of and diffusing the solidified treating agent by gas evolved from the gas-generating agent.

Another aspect of the present invention is a method of remedying soil contaminated with a contaminant, which comprises a step of coating a gas-generating compound with a material containing a microorganism which can decompose the contaminant, a step of scattering the material by means of a gas evolved from the gas-generating agent to diffuse the microorganism into the soil, and a step of decomposing the contaminant using the microorganism.

Another aspect of the present invention is a method of remedying soil contaminated with a contaminant, which comprises a step of coating a gas-generating compound with a material which can activate a microorganism which can decompose the contaminant, a step of scattering the material by means of a gas evolved from the gas-generating agent into the soil, and a step to decompose the contaminant using the microorganism diffused in the soil.

One embodiment of the present invention is an apparatus for solid diffusion, which comprises a pair of explosion-proof plates, between which a gas-generating compound containing an explosive inside and coated with a solid to be diffused in an environment is provided, and an ignition means for the explosive.

Another aspect of the present invention is a method of injecting a liquid into a medium, in which a liquid stored in a container is injected into the medium by means of a blast.

Another aspect of the present invention is a method of injecting a liquid into a medium, which comprises steps of:

preparing an apparatus for liquid injection, the apparatus comprising a cylindrical probe having a nozzle provided near the conical tip thereof, the cylindrical probe internally having a liquid-storing part communicated to the nozzle, and a chamber for gas generating agent having an ignition means, the chamber being positioned next to the liquid-storing part separated by a movable partition plate and provided with a lid which can tightly close the chamber at the opposite end from the movable partition plate;

storing a liquid to be injected into the medium in the liquid-storing part, and storing a predetermined amount of a gas generating agent and an explosive in the chamber;

installing the liquid injection apparatus at a predetermined site of the medium so that the nozzle remains within the medium; and igniting the gas generating agent in the chamber to spout the liquid in the liquid-storing part through the nozzle so that the liquid is injected into the medium.

Another aspect of the present invention is a method of remedying soil contaminated with a contaminant, which comprises steps of:

preparing an apparatus for liquid injection, the apparatus comprising a cylindrical probe having a nozzle provided near the tapered end thereof, the cylindrical probe internally having a liquid-storing part communicated to the nozzle, and a chamber for gas generating agent having an ignition means, the chamber being positioned next to the liquid-storing part separated by a movable partition plate and provided with a lid which can tightly close the chamber at the opposite end from the movable partition plate;

storing a liquid containing a microorganism which can decompose the contaminant in the liquid-storing part, and storing a predetermined amount of a gas generating agent and an explosive in the chamber;

installing the liquid injection apparatus at a predetermined site of the soil so that the nozzle remains within the soil, and igniting the gas generating agent in the chamber to spout the liquid in the liquid-storing part through the nozzle so that the liquid is injected into the soil.

One embodiment of the present invention is a liquid injection apparatus comprising a cylindrical probe having a nozzle provided near the tapered end thereof, the cylindrical probe internally having a liquid-storing part communicated to the nozzle, and a chamber for gas generating agent having an ignition means, the chamber being positioned next to the liquid-storing part separated by a movable partition plate and provided with a lid which can tightly close the chamber at the opposite end from the movable partition plate.

Another embodiment of the present invention is an apparatus for injecting a liquid into soil contaminated with a contaminant, which comprises a cylindrical probe internally having a liquid-storing part, a part for gas generating agent which is positioned next to the liquid-storing part with a movable partition plate between, and provided with an ignition means, and a nozzle part for supplying the liquid stored in the liquid-storing part to the soil, wherein the part for gas generating agent can be tightly sealed by a lid at the end opposite from the movable partition plate.

DETAILED DESCRIPTION OF THE PREFERRED EMBODIMENTS

First Embodiment

Figure 1:
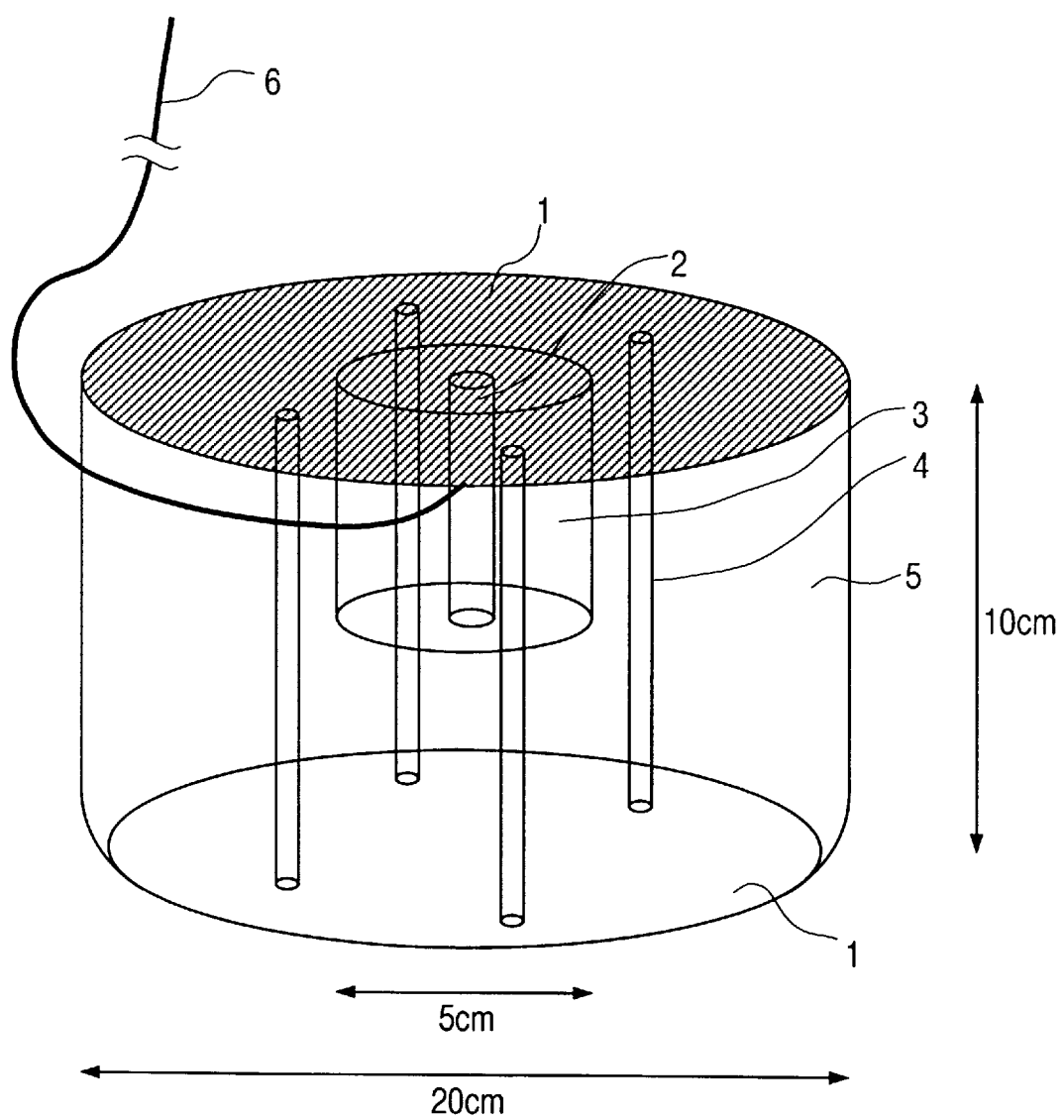
FIG. 1 is a schematic sectional view of a treating agent diffusing apparatus according to one embodiment of the present invention.
Figure 2:
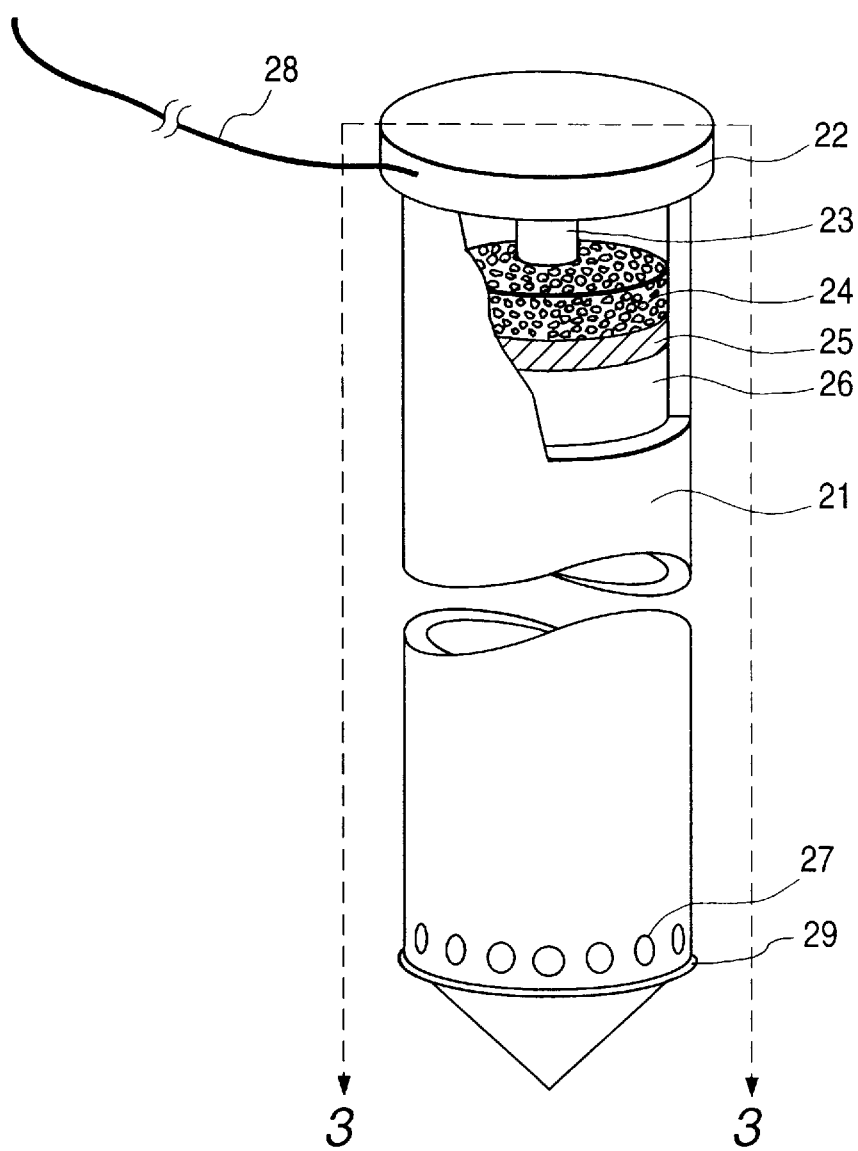
FIG. 2 is a schematic perspective view of a liquid injection apparatus according to one embodiment of the present invention.
Figure 3:
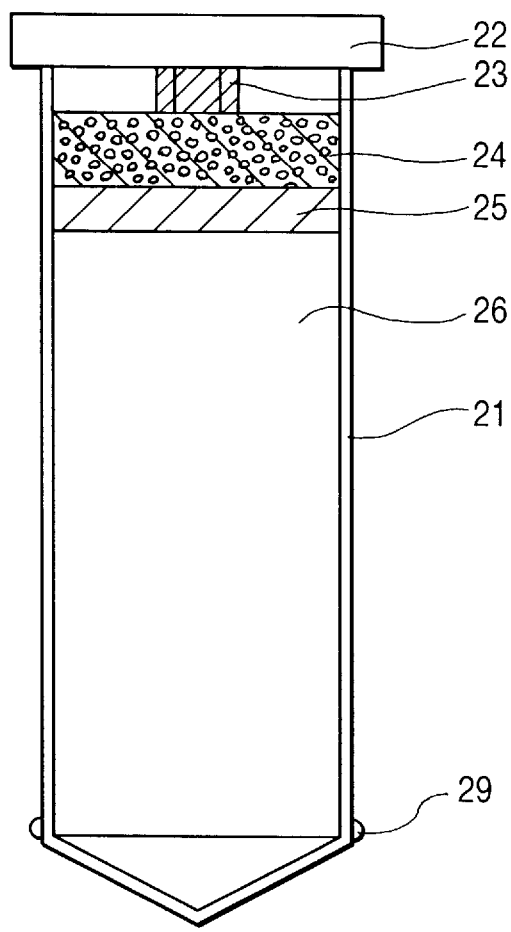
FIG. 3 is a cross-sectional view taken on 3—3 line of FIG. 2.

This embodiment is based on a finding that, when a solidified treating agent containing a microorganism, nutrients and the like is scattered from an injection port of the injection element into soil using a high-pressure gas generated from a gas-generating agent as a propulsive force, the injected microorganism etc. can be injected at an increased speed from the injection port without increasing the volume of the agent, where the microorganism and/or a growth-stimulating substance are not affected by the gas evolved from the gas-generating agent, since the gas temperature is lower than that of the explosion gas of the explosive.

When a liquid agent containing microorganisms and nutrients and the like is injected under pressure into soil, the area wherein the solution can be injected is mostly decided by the water permeation coefficient of the soil and the amount of the solution injected. For example, in the case of a sand layer having a large water permeation coefficient, the injected liquid agent spreads almost spherically from the injection point filling the voids of the soil, finally in a form of sphere the size of which is decided by the amount of the injected solution and the porosity of the soil, while a part of the solution falls down spontaneously due to its own weight. In the case of loam layer having a smaller water permeation coefficient, the injected liquid agent spreads in a vein-like form along the weaker soil structure. In both cases, the injected flow is distributed to the dendroidal flow ends, thus the migration speed of the liquid agent quickly drops in the end. Accordingly, in order to prevent the migration speed from decreasing, it is necessary to raise the injection speed of the liquid agent at the injection port. But simply raising the injection speed leads to an increase in the amount of the solution to be injected, resulting in a problem such as liquefaction of the ground. Thus, it is necessary not to increase the amount injected.

In order to increase the injection speed without increasing the amount injected, the pressure of a high-pressure gas can be utilized. As a source of a high-pressure gas, there are gas-generating agents which evolve a gas, such as nitrogen in a drastic chemical reaction initiated by heat, or a small amount of an explosive. Examples of the gas-generating agent include those mainly composed of a metal azide and an appropriate oxidizing agent, or a nitrogen-containing substance such as azidocorbonamide and an oxyhalogenic acid salt including chlorates and bromates such as potassium chlorate, sodium chlorate, potassium bromate and sodium bromate. These gas-generating agents have a combustion temperature, illustratively around 350° F. (176° C.), lower than that of the ordinary explosive e.g. 1500° F. (815° C.). Accordingly, the microorganism and the substance such as nutrients are less affected in the diffusion process by such a gas-generating agent.

Examples of an igniter for such a gas-generating agent include commonly used agents such as propellants, boron niter, magnesium Teflon, and blasting powder. When such an igniter is ignited, the gas-generating agent is ignited to produce a gas such as nitrogen, and thereby the microorganism and nutrients, inducers etc. are diffused in the soil.

Illustrative examples of a gas-generating agent comprising a metal azide and an appropriate oxidizing agent are those composed of at least one compound selected from alkali metal azides, alkaline earth metal azides and aluminium azide, and a metal oxide such as $Fe_2O_3$, $NiO_2$, and CuO. For example, the gas-generating reaction of an agent containing sodium azide and $Fe_2O_3$ is represented by the following formula:

$$6NaN_3+Fe_2O_3\rightarrow 2Fe+3Na_2O+9N_2\uparrow$$

$$4NaN_3+Fe_2O_3\rightarrow (Na_2O)_2FeO+6N_2\uparrow$$

When an explosive is used as an igniter for a gas-generating agent, it is preferable that the microorganism and the nutrient to be diffused are not directly touched by the blast from the explosive. For example, in a constitution wherein the explosive is contained in a gas-generating agent, and the gas-generating agent is coated with a solidified treating agent, that means a layer of the gas-generating compound is provided between the explosive and the solidified treating agent. The blast from the explosive therefore does not directly touch the solidified agent and the microorganism contained in the solidified treating agent can be prevented from being killed or debilitated, and the deterioration of nutrients etc. can be controlled as well.

An effective method for solidifying the treating agent is gelation of the treating agent or kneading it into clay. This solidification of the treating agent dispenses with a mechanism to store a liquid in an injection apparatus and to scatter it in all directions, thereby the apparatus can be simplified as well.

According to the method in which a solidified treating agent is scattered and injected in the soil by a high-pressure gas, almost all the voids in the soil are not filled with the treating agent. The solidified treating agent can be injected and distributed in a large area of the soil, leaving the gas-filled voids in the soil. That means, the injection treatment can be carried out without increasing the water content of the soil after the injection to saturation, thus the downward moving of the treating agent due to its own weight hardly occurs. Therefore, the loss of the microorganism and nutrients is small, with less opportunity of secondary pollution. This method makes cracks in the ground, soil or clay of high consolidation, so that oxygen and nutrient can be more easily supplied to the microorganisms. Use of the gas-generating agent also dispenses with such an instrument as a high pressure compressor or a high pressure gas bomb at the treatment site.

The effective blast pressure according to the present invention is from 2 to 500 atmospheres, although it depends on the conditions of the object soil. If it is 2 atmospheres or lower, the treating agent cannot be fully injected, and if it is 500 atmospheres or higher, various problems will arise by high pressure, including deterioration of the injected treating agent, damage of the injection apparatus, and disturbance of the soil.

One example of a treating agent injection apparatus is shown in FIG. 1. The injection apparatus comprises explosion-proof plates 1, explosive 2 for ignition, a gas-generating agent 3 for high pressure gas evolution, four pillars 4 connecting the upper and lower explosion proof plates 1, a treating agent 5, and an electric wire 6 for igniting the explosive. The upper and lower explosion-proof plates 1 make the solidified treating agent diffuse in horizontal directions preventing it from spouting to the soil surface from the dug and weakened ground with the blast at the explosion, and they are illustratively robust iron plates. The treating agent was solidified, for example into gel, so that it is not deteriorated by high temperature and high pressure due to the explosion. This injection apparatus is buried at a necessary depth and the explosive is ignited to generate a gas, then the solidified treating agent is blown off so that the treating agent is injected into the soil.

Second Embodiment

FIG. 2 shows a schematic perspective view of an apparatus for injecting a liquid into soil which can be used in soil remediation process of the second embodiment of the present invention, and FIG. 3 is a cross-sectional view taken on 3—3 line of the liquid injection apparatus shown in FIG. 2. In FIG. 2 and FIG. 3, 21 designates a cylindrical probe made of, illustratively, a metal. Inside the probe, a liquid-storing part 26 is provided to store a liquid agent to be injected into the soil, which can contain, for example, a microorganism that can decompose a contaminant in the soil. A gas generating agent-storing part is arranged next to the liquid-storing part 26 separated by a movable partition plate 25, and the gas generating agent-storing part contains a gas-generating agent 24 and an explosive 23 to ignite the gas-generating agent 24. An electric wire 28 to pass an electric current for igniting the explosive 23 is also disposed. Sign 22 denotes an explosion-proof lid provided at the opposite end of the gas generating agent-storing part from the movable partition plate 25. By this lid, the gas generated in the gas generating agent-storing part is not released from the gas generating agent-storing part, and efficiently used for moving the partition plate. Sign 27 denotes a nozzle provided near the conically shaped tip of the cylindrical probe and the liquid stored in the liquid storing part is injected into the soil through this nozzle. It is needless to say that the whole cylindrical probe has a sufficient strength that can resist the explosion occurring in the gas generating agent-storing part, and the gas generation.

Next, a method of remedying soil using this injection apparatus will be explained. First, a soil treating liquid agent is stored in the liquid storing part of the cylindrical probe. The agent contains ingredients such as a microorganism which can decompose the contaminant in the soil, a nutrient necessary for the growth of the microorganism, and an inducer which is necessary for the microorganism to express the contaminant decomposing ability. During this storing operation, it is preferable to shut the nozzle appropriately using an adhesive tape and the like so that the liquid agent is not leaked through the nozzle. In case that a flange 29 is provided under the nozzle 27, the flange 29 prevents the adhesive tape from detaching from the nozzle during storing. Otherwise, before adding the liquid agent to the liquid storing part, the above-mentioned injection apparatus is buried at the predetermined location of the soil to be purified, with the nozzle at the desired depth, and the liquid agent is added to the liquid storing part.

In the gas generating agent-storing part, a gas-generating agent and an igniter thereof such as an explosive are stored. The gas-generating agent generates a gas such as nitrogen in a drastic chemical reaction initiated by, for example, heat or explosion of a small amount of an explosive. Then the gas generating agent-storing part is tightly closed with a lid 22, and electric current is applied to an electric wire 28 to ignite the explosive 23 to initiate the gas-generating reaction. The resulting gas instantaneously pushes the movable partition plate 25 downwards, which makes the liquid agent spout through the nozzle and injects it into the soil. As the gas-generating agent and the igniter, substances similar to those described in the first embodiment can be also used in this embodiment. In this embodiment, as the partition plate prevents the high pressure gas produced in the gas generating agent-storing part from directly contacting the microorganism and other substances in the liquid-storing part, it is possible to use an explosive alone, without using the gas-generating agent, to evolve a blast having high temperature and high pressure to push down the partition plate.

According to the method in which a liquid agent is scattered and injected in the soil by a high-pressure gas, almost all the voids in the soil are not filled with the liquid agent. The liquid agent can be injected and distributed in a large area of the soil, leaving the gas-filled voids in the soil. That means, the injection treatment can be carried out without increasing the water content of the soil after the injection to saturation, thus the downward moving of the liquid agent due to its own weight hardly occurs. Therefore, the loss of the microorganism and nutrients is small with less opportunity of secondary pollution. This method makes cracks in the ground, soil or clay of high consolidation, so that oxygen and nutrient can be more easily supplied to the microorganisms.

The effective pressure according to the present invention is from 2 to 500 atmospheres, although it depends on the conditions of the object soil. The pressure of the blast within this range allows efficient injection of the liquid agent without causing deterioration of the liquid agent, breakage of the injecting apparatus, or disturbance of the object soil.

The present embodiment is explained in relation with the soil remediation method, however, this embodiment is not limited to the remediation of the soil alone. For example, the method can be applied for diffusing a desired liquid, such as a plant fertilizer, into the soil. In addition to that, the medium into which the liquid is injected is not limited to soil.

According to the present invention, such a ground instrument as a high pressure compressor and a high pressure gas cylinder is not necessary to be provided for injection and diffusion of a soil remediation liquid into soil. Furthermore, the pressure of the gas generated from the gas generating agent provides the liquid enough pressure to make cracks centering the injection port, and even hard ground or soil such as clay through which water cannot be easily infiltrated allows the liquid agent be diffused in a wide area. Therefore, a small amount of the liquid agent containing the microorganism and the nutrient and the like can be injected and distributed extensively in a large area of the soil utilizing the high pressure obtained from the gas-generating agent, to provide a microbial remediation method which is cost-effective, time-efficient, and safe without causing secondary contamination.

Furthermore, since the high temperature gas accompanying the explosion of the explosive does not directly contact the liquid agent, the soil-remedying microorganism or the inducer for the microorganisms to express the contaminant decomposing ability, and the nutrient for the growth of the microorganism, the microorganism and these substances can be protected from being deteriorated or killed during the injection and diffusion into the soil.

EXAMPLES

The present invention will be further illustrated with the following examples but those examples are not to be construed to limit the present invention.

Example 1

A treating agent diffusion apparatus shown in FIG. 1 was prepared, in which two iron discs 1 having a diameter of 20 cm and a thickness of 5 mm were connected with 4 pillars 4 so that the discs became parallel each other allowing a 10 cm disc spacing. A gas-generating agent 3 comprising 69% by weight of sodium azide and 31% by weight of $Fe_2O_3$ was molded into a pellet having a diameter of 5 mm, and a height of 5 mm by a hydraulic tablet compressing machine under a pressure of 60 $kg/cm^2$. An igniting device for a gas-generating agent, which comprises an igniting heater and a smokeless powder (IMR4895, available from IMR Explosive Manufacturing Company) and wrapped in a polyethylene film and made into a cylindrical form, was buried at the center of the pellet and the pellet was coated with a gelled treating agent 5 containing fluorescein to provide a triple structure. This was disposed between the two iron plates of the above-mentioned diffusion apparatus.

The volume of the gel was about 3000 $cm^3$ and 2% agarose having a low melting point (Sea Plaque GTG Agarose available from Takara Standard Co., Ltd., having a gelling temperature of about 25° C.) was used for it. Fluorescein was mixed in an amount of 0.01M (3.89 $mg/cm^3$).

This injection apparatus was installed in a model test soil comprising fine sand packed in a concrete container of five cubic meters (the average water content of the fine sand was 13%) at a location about 4 m deep from the surface, then the container was filled with the sand again and an electric current was applied to the wire 6 so that the temperature of the ignition was raised to 180° C. or higher to ignite the gas-generating agent to generate gas, and the gelled treating agent was diffused and injected.

About 10 minutes later, the ground was bored at 4 sites 4 m deep at a distance of 25 cm, 30 cm, 40 cm, 60 cm, and 100 cm from the center of the injection apparatus, and at a distance of 350 cm from the center of the injection apparatus, which was regarded as the site wherein no agent was diffused. From each sampling point, 7 g of the soil was collected without disturbing the soil, and 5 g of the soil was used for measuring the density.

One gram of the sample soil was dispersed in water, and exposed to ultraviolet rays and the presence of the fluorescence was checked. The average value of the soil density and the presence/absence of the fluorescence at each site are shown in Table 1.

It is clear from the results that the treating agent can be diffused to the distance of about 100 cm, by the use of the treating agent injection apparatus provided with the gas generator. To the distance of about 60 cm, the soil density was reduced by the blast and this allows us to assume that the voids of the soil were increased and oxygen could be more easily supplied for the growth and metabolism of the diffused microorganisms.

Example 2

A treating agent diffusing apparatus similar to that of Example 1 was prepared and a solidified treating agent having a triple structure which was similar to that used in Example 1 was provided between the two iron plates of the apparatus for diffusion. As the solidified treating agent to coat the outside of the gas-generating agent pellet 3, a clay-like material produced by kneading a fluorescein fluorescent dye of the same amount as that used in Example 1, with bentonite (available from Hojun-yoko, under the commercial name of Bengel FW) was used.

This apparatus was set at 4 m deep in the test soil as in Example 1, then the container was filled with the sand again and an electric current was applied to the wire 6 so that the temperature of the ignition heater was raised to 180° C. or higher to ignite the gas generating agent to generate a gas, and to diffuse and inject the clay-like agent.

About 10 minutes later, the soil was collected in the same manner as that used in Example 1 and the density of the soil and the presence/absence of the fluorescence were determined. The results are shown in Table 1.

The results show that the gelled treating agent and the solid obtained by kneading the treating agent with bentonite had nearly the same results.

Comparative Example 1

A treating agent diffusing apparatus similar to that used in Example 1 was prepared except that a gas-generating agent was not used, smokeless powder (IMR4895, available from IMR Explosive Manufacturing Company) 10 times as much as that used in Example 1 was coated with a clay-like material which was obtained by kneading fluorescein of the same amount as used in Example 1 and bentonite (available from Hojun-yoko, under the commercial name of Bengel FW) to provide a double layer structure.

The apparatus was installed in the model soil which was similar to that used in Example 1, at a location about 4 m below the surface and buried. Then an electric current was applied to the wire 6 so that the temperature of the ignition heater was raised to 180° C. or higher, to explode the explosive, and the clay-like material was diffused and injected.

About 10 minutes later, the soil was collected in the same manner as in Example 1, and the density of the soil and the presence/absence of the fluorescence were determined. The results show, as given in Table 1, that the fluorescein could not observed at a site 30 cm or more away from the apparatus in Comparative Example 1, and the decrease in the soil density was smaller than those in Example 1 and Example 2. Therefore, the soil density was affected less than in Example 1 where the gas-generating compound was used, although in Comparative Example 1 the explosive was used in an amount 10 times as much as that used in Example 1. Also, it seems that a considerable amount of fluorescein was decomposed by the heat of the blast of the explosive.

TABLE 1

Presence/Absence of fluorescence and average soil density at each site

| Distance from the Apparatus (cm) | Presence/Absence of fluorescence | | | Density (g/cm$^3$) | | |
|---|---|---|---|---|---|---|
| | Example 1 | Example 2 | Comparative Example 1 | Example 1 | Example 2 | Comparative Example 1 |
| 25 | Present | Present | Present | 1.11 | 1.10 | 1.14 |
| 30 | Present | Present | Absent | 1.12 | 1.12 | 1.18 |
| 40 | Present | Present | Absent | 1.13 | 1.14 | 1.22 |
| 60 | Present | Present | Absent | 1.18 | 1.19 | 1.22 |
| 100 | Present | Present | Absent | 1.23 | 1.23 | 1.23 |
| 350 | Absent | Absent | Absent | 1.23 | 1.23 | 1.23 |

Example 3

An apparatus similar to that used in Example 1 was prepared except that the gel contains a trichloroethylene decomposing bacterium strain J1 (Deposit Number in National Institute of Bioscience and Human-Technology, Agency of Industrial Science and Technology: FERM BP-5102) which is known to produce a colony on a phenol glutamate agar medium shown in Table 2 at 30° C. in about 20 hours, at a concentration of $10^9$ cells/cm$^3$ instead of the fluorescent dye. The apparatus was buried 4 m below the surface of the model soil in a manner similar to that used in Example 1, and the explosive was ignited and the treating agent was diffused and injected.

About 10 minutes later, 1 g of the soil was collected in a manner similar to that used in Example 1 and it was dispersed in sterilized diluting water, and applied onto a phenol glutamic acid agar medium and allowed to stand in a thermostatic chamber at 30° C. for about 20 hours. The number of the colonies was counted. Lysozyme was added to the remaining solution to lyse the bacteria in the soil and DNA was purified and recovered. PCR was then carried out by using primers which react only with DNA of strain J1 to carry out DNA amplification to detect the presence of J1 cells.

The results are shown in Table 3.

These results show that the bacteria can be diffused to the site of about 60 cm by the use of the treating agent diffusing apparatus employing the gas-generating agent. Furthermore, since the J1 was detected by colony formation on the plate, it was confirmed that the bacterium was not inactivated during the diffusion.

TABLE 2

Phenol glutamate agar medium composition

| x 10 M9 Inorganic Culture Medium | 20 ml |
|---|---|
| Sodium Glutamate | 0.4 g |
| Phenol | 20 μl |
| H$_2$O | 180 ml |
| Agar | 2.4 g |

Comparative Example 2

A treating agent diffusing apparatus similar to that used in Comparative Example 1 was prepared and a smokeless powder of the same amount as that used in Comparative Example 1 was prepared between two iron plates of the diffusion apparatus, then the outside of the explosive was further coated with a gel containing the same amount of strain J1 as that used in Example 2 to provide a double structure. Then it was installed in the model soil similar to that used in Example 2 about 4 m below the surface and covered with the sand. Electric current was applied to the wire 6 so that the temperature of the ignition heater was raised to 180° C. or higher to explode the explosive and the clay-like treating agent was diffused and injected.

About 10 minutes later, the soil was collected in the manner similar to that of Example 2, the measurement of the viable number of the bacterial cells and the detection of strain J1 DNA were carried out using an agar medium and PCR.

The results show that DNA of strain J1 could be detected up to the distance of 40 cm, however, the colonies grown on the plate were only those of up to 30 cm, and the viable number was very much smaller than the number of the cells originally put in the apparatus. This suggests that the high temperature and high pressure during the explosion killed the microorganism, even though the DNA was not decomposed.

TABLE 3

Presence/Absence of strain J1 DNA and average value of the number of bacteria at each site

| Distance from the Apparatus (cm) | Detection of DNA: Example 3 | Detection of DNA: Comparative Example 2 | Bacterial Number (cells/g soil): Example 3 | Bacterial Number (cells/g soil): Comparative Example 2 |
|---|---|---|---|---|
| 25 | Present | Present | $1 \times 10^7$ | $9 \times 10^3$ |
| 30 | Present | Present | $7 \times 10^6$ | $5 \times 10^3$ |
| 40 | Present | Present | $1 \times 10^6$ | 0 |
| 60 | Present | Absent | $5 \times 10^5$ | 0 |
| 100 | Present | Absent | $9 \times 10^4$ | 0 |
| 350 | Absent | Absent | 0 | 0 |

Example 4

A concrete container was filled with a model test soil (average water content of 13%, porosity of 0.30) in a similar way to that of Example 1, and the surface was covered with a Teflon sheet. A trichloroethylene aqueous solution was injected to the lower part of the model soil and left for about one week to provide contaminated soil having the trichloroethylene concentration of 10 μg/g soil.

Then strain J1 was grown to $10^9$ cells/cm$^3$, and subjected to centrifugation to remove the culture medium, and the microorganisms were suspended again in an aqueous solution containing 1% yeast extract, 2% of sodium lactate, and 1000 ppm of phenol in an amount of 1/10 equivalent of the removed culture medium, to provide a treating agent for injection. The injection solution of 300 cm$^3$ was mixed with 3000 cm$^3$ of a molten agarose gel having a low melting point, at about 35° C., then it was poured into an injection apparatus similar to that of Example 1 and left to stand at room temperature so that the gel was solidified. The apparatus was buried 4 m below from the surface, the explosive was ignited to generate the gas and the treating agent was diffused and injected into the soil.

Two days later, the model test soil was bored, and the soil was sampled in 4 horizontal directions extending radially from the injection site (two pairs of opposite directions) and the trichloroethylene concentration in each sample was measured by gas chromatography. The results showed that the trichloroethylene concentration in an area within about 50-cm radius from the center of the injection pipe was reduced to about 1 μg/g soil. Accordingly, it was found that the microorganism solution can be extensively injected maintaining the decomposition activity and remediation of soil over a wide region can be efficiently carried out by the use of a treating agent diffusing apparatus using a gas-generating agent.

Example 5

A cylindrical probe having an iron pipe of an outer diameter of 50 cm (a section thickness of 5 mm) and a length of 2 m, provided with a corn of 10 cm high was prepared as shown in FIG. 2 and FIG. 3. A gas-generating agent comprising 69% by weight of sodium azide and 31% by weight of $Fe_2O_3$ was molded into a pellet having a diameter of 5 mm, and a height of 5 mm by a hydraulic tablet compressing machine under the pressure of 60 kg/cm$^2$. A gas-generating agent igniting device which comprises an igniting heater and a smokeless powder (IMR4895, available from IMR Explosive Manufacturing Company) and which is wrapped in a polyethylene film and made into a cylindrical form was buried at the center of this pellet. The gas-generating agent pellet incorporating this igniting device was attached onto an inner surface of an explosion-proof lid 22, and the explosion-proof lid 22 was attached to the cylindrical probe 21. Under the gas-generating agent, a movable partition plate 25 which can be moved up and down within the probe 21 was provided at 20 cm below the lid, and it would be pressed down to the lowest part of the iron tube when ignited, to push the liquid out from the liquid storing part 26 at the lower part of the iron tube. The lower part of the iron plate of the movable partition plate 25 had a rubber lining for heat insulation and prevents the liquid agent from deteriorating by the heat of the explosion. Near to the pointed end of the probe 21, 16 nozzles 27 were provided in the perpendicular direction to the central axis of the tube, and about 0.3 m³ of distilled water was poured through them, and tightly sealed with an adhesive tape so that the tape was not turned up by friction when the tube was driven into the soil.

The injection tube was driven into model test soil comprising fine sand packed in a concrete container of five meters cubic (when the average water content of the fine sand was 13%) so that the projected end was in 2.5 m below the surface. An electric current was applied to an electric wire 28 so that the temperature of the ignition heater was raised to 180° C. or higher, to explode the explosive and generate a gas from the gas-generating agent. The distilled water was instantaneously injected into the soil.

About 10 minutes later, when the distilled water was supposed to be sufficiently infiltrated into the soil and migration was finished, 5 g of soil 2.5 m under the surface was bored respectively at a distance of 60 cm, 70 cm, 100 cm, 150 cm, and 200 cm from the center of the injection tube, and at 4 sites 350 cm apart from the center of the injection tube, each of the 4 sites corresponds to the corner of the concrete container, without disturbing the soil, and the water content was measured.

The average value of the water content at each site is shown in Table 4.

The results show that the liquid agent can be injected to a site of about 200 cm by the use of the liquid agent injection apparatus using the gas-generating apparatus.

Comparative Example 3

A Manchette pipe of an outer diameter of 50 mm having a rubber sleeve was driven into model test soil (average water content of the fine sand was 13%), which was similar to that used in Example 5 so that the nozzle reached a depth of 2.5 m from the surface, and 0.3 m³ of distilled water was sent into the soil under pressure at 10 l/min.

About 10 minutes later, the water content was measured in a manner similar to that of Example 5. The results are shown in Table 4.

The results showed that the liquid agent can be injected to a distance of a about 100 cm by the use of Manchette pipe.

TABLE 4

Average value of the water content of the soil at each site

| Distance from the Apparatus | Water Content (%) | |
|---|---|---|
| (cm) | Example 5 | Comparative Example 3 |
| 60 | 17 | 18 |
| 70 | 16 | 16 |
| 100 | 15 | 14 |
| 150 | 15 | 13 |
| 200 | 14 | 13 |
| 350 | 13 | 13 |

Example 6

Into a liquid-storing part 26 of probe 21 to which a gas-generating agent similar to that used in Example 5 was set, was injected about 0.3 m³ of a liquid agent containing 0.01M fluorescein, Corynebacterium sp. strain J1 (Deposit Number in National Institute of Bioscience and Human-Technology, Agency of Industrial Science and Technology: FERM BP-5102) which is a trichloroethylene decomposing bacterium and known to produce a colony on a phenol glutamic acid agar medium of Table 5 at 30° C. in about 20 hours, was suspended in a concentration of $10^9$ cells/cm³. It was tightly sealed with an adhesive tape so that the tape was not turned up by the friction during the boring of the pipe.

The injection tube was driven into model test soil (porosity of the fine sand was 0.30) which was similar to that used in Example 5 so that the nozzle reached a depth of 2.5 m from the surface, and ignited to instantaneously inject the liquid agent into the soil.

About 10 minutes later, soil samples of around 7 g were collected at a distance of 60 cm, 70 cm, 100 cm, 150 cm, 200 cm and 350 cm, at 2.5 m below the surface by boring in a process similar to that used in Example 5, and 5 g of the soil was used for measuring the density.

One gram of the soil was dispersed in sterilized diluting water and plated onto a phenol glutamate agar medium, and the remaining solution was exposed to ultraviolet rays to detect the presence of the fluorescence. The agar plates were incubated in an incubator at 30° C. for about 20 hours and the number of colonies was determined. The average value of the density of the soil at each site, the presence of fluorescence and the average viable number of strain J1 are shown in Table 6.

The results show that the microorganisms and the liquid agent can be injected to a distance of about 200 cm by the use of the liquid agent injection apparatus using a gas-generating agent. Furthermore, the growth of the microorganisms on the plate assured that the microorganism is not inactivated by the high temperature and high pressure at the explosion. As the site in which the microorganism was detected showed a decreased density, it was assumed that the voids in the soil were increased and the oxygen which was necessary for the growth and metabolism of the diffused microorganism could be more easily supplied.

TABLE 5

Phenol glutamate agar medium composition

| | |
|---|---|
| × 10 M9 Inorganic Culture Medium | 20 ml |
| Sodium Glutamate | 0.4 g |
| Phenol | 20 μl |
| H₂O | 180 ml |
| Agar | 2.4 g |

Comparative Example 4

A Manchette pipe similar to that used in Comparative Example 3 was driven into a model test soil (porosity of the fine sand was 0.30) similar to that used in Example 5 so that the nozzle reached a depth of 2.5 m from the surface, and 0.3 m³ of a liquid agent containing strain J1 and fluorescein of the same concentrations as that used in Example 6 was sent into the soil under pressure at 10 l/min.

About 10 minutes later, the soil density and the bacterial number were measured by boring in the manner similar to that used in Example 5. The results are shown in Table 6.

TABLE 6

Presence/Absence of fluorescence, and average viable number of strain J1 and soil density at each site

| Distance from the Apparatus (cm) | Presence/Absence of fluorescence | | Bacterial Number (cells/g soil) | | Density (g/cm³) | |
|---|---|---|---|---|---|---|
| | Example 6 | Comparative Example 4 | Example 6 | Comparative Example 4 | Example 6 | Comparative Example 4 |
| 60 | Present | Present | 8 × 10⁶ | 9 × 10⁶ | 1.11 | 1.14 |
| 70 | Present | Present | 7 × 10⁶ | 5 × 10⁶ | 1.12 | 1.15 |
| 100 | Present | Present | 1 × 10⁶ | 6 × 10⁴ | 1.13 | 1.18 |
| 150 | Present | Absent | 5 × 10⁵ | 0 | 1.15 | 1.22 |
| 200 | Present | Absent | 1 × 10⁵ | 0 | 1.20 | 1.23 |
| 350 | Absent | Absent | 0 | 0 | 1.23 | 1.23 |

Example 7

A concrete container was filled with model test soil (average water content was 13%, porosity was 0.30) in the manner similar to that used in Example 5 and the surface was covered with a Teflon sheet. A trichloroethylene aqueous solution was injected into the lower part of the model soil and allowed to stand for about one week to prepare contaminated soil having trichloroethylene concentration of 10 μg/g soil.

Then strain J1 was cultured and grown to 10⁹ cells/cm³, centrifuged to remove the culture medium, and the cells were suspended again in an aqueous solution containing 0.1% yeast extract, 0.2% of sodium lactate, and 100 ppm of phenol, the amount of which was the same as that of removed culture medium, to provide a liquid agent for injection. The injection solution of 300 l was poured into a liquid agent injection pipe 1 used in Example 5, and buried in the ground 3 m deep from the surface. The explosive was ignited and the liquid agent was diffused.

Two days later, the model test soil was bored, and the soil samples in 4 horizontal directions extending radially from the injection site (two pairs of opposite directions) was taken and the trichloroethylene concentration in each soil sample was measured by gas chromatography. The results showed that the trichloroethylene concentrations in an area within about a 100-cm radius from the probe 21 was reduced to about 1 μg/g soil. Accordingly, it was found that the microbial suspension can be extensively injected maintaining the decomposition activity and remediation of a wide soil region can be efficiently carried out by the use of a liquid agent diffusing apparatus using a gas-generating agent.

What is claimed is:

1. A method for diffusing into a soil a microorganism alone or in combination with a nutrient for a microorganism in the soil comprising the steps of:

providing a diffusion element comprising an igniter and a gas generating agent coated with said microorganism and optionally a nutrient, said microorganism and optional nutrient being solidified, the igniter being provided in the gas-generating agent so as not to directly contact with said solidified microorganism and optional solidified nutrient; and evolving a gas from the gas-generating agent by igniting the igniter, and diffusing said solidified microorganism and optional solidified nutrient into the soil, wherein the gas-generating agent has a combustion temperature of 350° F., and the gas-generating agent comprises a metal azide and an oxidizing agent, the metal azide being selected from a group consisting of alkali metal azides alkaline earth metal azides and aluminum azide, and an oxidizing agent being selected from a group consisting of $Fe_2O_3$ $NiO_2$ and CuO, or azidocarbonamide and an oxyhalogenated acid salt selected from a group consisting of potassium chlorate, sodium cblorate, potassium bromate, and sodium bromate, and wherein the igniter is an explosive, said microorganism remaining viable after said diffusing.

2. The method according to claim 1, wherein the at least one of a solidified microorganism and a solidified nutrient is solidified by gelling.

3. The method according to claim 1, wherein the at least one of a solidified microorganism and a solidified nutrient is solidified by mixing with clay.

4. A method of diffusing a treating agent according to claim 1, in which the pressure of the gas generated from the gas-generating agent is 2–500 atmospheres.

5. The method according to claim 1, in which the diffusion element comprises a pair of explosion-proof plates which are linked to each other and the at least one of a solidified microorganism and a solidified nutrient placed between the explosion-proof plates.

6. A method of remedying a soil contaminated with a contaminant, comprising the steps of:

providing a gas generating compound surrounded by a solidified microorganism capable of degrading the contaminant, alone or in combination with a solidified nutrient for a microorganism capable of degrading the contaminant in the soil, the gas generating compound containing an explosive which is embedded in the gas generating compound so as not to directly contact with said solidified microorganism and the optional solidified nutrient;

evolving a gas from the gas-generating agent by igniting the explosive and diffusing said solidified microorganism and the optional solidified nutrient into the soil; and degrading the contaminant with the microorganism, wherein the gas-generating agent has a combustion temperature of 350° F., and the gas-generating agent comprises a metal azide and an oxidizing agent, the metal azide being selected from a group consisting of alkali metal azides, alkaline earth metal azides and aluminum azide, and an oxidizing agent being selected from a group consisting of $Fe_2O_3$, $NiO_2$ and CuO, or azidocarbonamide and oxyhalogenated acid salt selected from a group consisting of potassium chlorate, sodium chlorate, potassium bromate and sodium bromate, and wherein the igniter is an explosive, said microorganism remaining viable after said diffusing.

7. A method of remedying soil according to claim 6, in which the contaminant is phenol.

8. A method of remedying soil according to claim 6, in which the contaminant is an organochloric compound.

9. A method of remedying soil according to claim 8, in which the organochloric compound is trichloroethylene.

* * * * *

UNITED STATES PATENT AND TRADEMARK OFFICE
CERTIFICATE OF CORRECTION

PATENT NO. : 5,877,390

DATED : March 2, 1999

INVENTOR(S) : AKIRA KURIYAMA, ET AL.

It is certified that error appears in the above-identified patent and that said Letters Patent is hereby corrected as shown below:

<u>COVER PAGE [75] INVENTORS</u>,
"Kushihashi," should read --Isehara,--.
<u>COLUMN 1</u>,
Line 12, "amount" should read --number--; and
Line 45, "up: thus," should read --up. Thus,--.
<u>COLUMN 10</u>,
Line 28, "not" should read --not be--.
<u>COLUMN 12</u>,
Line 58, "corn of" should read --core--.
<u>COLUMN 13</u>,
Line 67, "a" (second occurrence) should be deleted, and "of" (second occurrence) should read --of a--.
<u>COLUMN 16</u>,
Line 42, "azides" should read --azides,--.

Signed and Sealed this

Twenty-first Day of September, 1999

Attest:

Q. TODD DICKINSON

*Attesting Officer*  *Acting Commissioner of Patents and Trademarks*